US010734757B2

(12) United States Patent
Westerfield et al.

(10) Patent No.: US 10,734,757 B2
(45) Date of Patent: *Aug. 4, 2020

(54) ELECTRICAL MULTI-CONNECTOR FEEDTHROUGH PANEL AND METHOD THEREFOR

(71) Applicant: The Boeing Company, Chicago, IL (US)

(72) Inventors: Scott Roger Westerfield, Everett, WA (US); Robert Arthur Nye, Lynnwood, WA (US); Robert Thomas Johnson, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/683,971

(22) Filed: Nov. 14, 2019

(65) Prior Publication Data

US 2020/0083637 A1    Mar. 12, 2020

Related U.S. Application Data

(63) Continuation of application No. 15/984,985, filed on May 21, 2018, now Pat. No. 10,516,232.

(51) Int. Cl.
| | |
|---|---|
| *H01R 13/533* | (2006.01) |
| *H01R 13/42* | (2006.01) |
| *H01R 13/52* | (2006.01) |
| *H01R 13/74* | (2006.01) |

(52) U.S. Cl.
CPC ........... *H01R 13/533* (2013.01); *H01R 13/42* (2013.01); *H01R 13/521* (2013.01); *H01R 13/74* (2013.01); *H01R 13/5202* (2013.01)

(58) Field of Classification Search
CPC ....... H01R 13/533; H01R 13/73; H01R 13/74
USPC .................................. 439/544, 559, 571, 572
See application file for complete search history.

(56) References Cited

U.S. PATENT DOCUMENTS

| | | | |
|---|---|---|---|
| 2,813,692 | A | 11/1957 | Bremer et al. |
| 3,998,515 | A | 12/1976 | Panek |
| 4,422,700 | A | 12/1983 | Krenz |
| 4,938,707 | A | 7/1990 | Guimond et al. |

(Continued)

OTHER PUBLICATIONS

European Search Report, European Application No. 19174985, dated Aug. 14, 2019.

*Primary Examiner* — Tulsidas C Patel
*Assistant Examiner* — Marcus E Harcum
(74) *Attorney, Agent, or Firm* — Perman & Green LLP

(57) ABSTRACT

An electrical multi-connector feedthrough panel comprising a frame configured to couple with a structure and to seal, at least in part, a penetration in the structure across a pressure differential, wherein a first pressurized environment is disposed on one side of the sealed penetration, and wherein a second pressurized environment, different than the first pressurized environment, is disposed on an opposite side of the sealed penetration a plurality of electrical connector insert shells monolithically formed with the frame, each of the plurality of electrical connector insert shells protruding from opposite sides of the frame to form a respective passage through the frame and being configured to sealingly couple with at least one electrical butt connector to thereby seal the respective passage; and an electrically conductive coating disposed on the frame and on each of the plurality of electrical connector insert shells to thereby form an electrical bonding surface.

20 Claims, 8 Drawing Sheets

(56) References Cited

U.S. PATENT DOCUMENTS

| | | | |
|---|---|---|---|
| 5,298,683 | A | 3/1994 | Taylor |
| 5,328,388 | A | 7/1994 | Fust et al. |
| 5,675,300 | A | 10/1997 | Romerein |
| 6,045,400 | A | 4/2000 | Detter |
| 6,159,030 | A | 12/2000 | Gawron et al. |
| 6,174,206 | B1 | 1/2001 | Yentile et al. |
| 6,835,093 | B1 | 12/2004 | Griffin et al. |
| 7,081,012 | B2 | 7/2006 | Gensert et al. |
| 7,396,254 | B2 | 7/2008 | Harmelink et al. |
| 7,740,499 | B1 | 6/2010 | Willey et al. |
| 8,262,372 | B2 | 9/2012 | Wang et al. |
| 9,502,812 | B2 | 11/2016 | Akagi et al. |
| 2006/0160415 | A1 | 7/2006 | Pollock |
| 2006/0199428 | A1 | 9/2006 | Montena |
| 2009/0176405 | A1 | 7/2009 | Kleinkorres |
| 2009/0261204 | A1 | 10/2009 | Pitt |
| 2010/0035452 | A1 | 2/2010 | Mudge, III et al. |
| 2013/0338750 | A1 | 12/2013 | Eck et al. |
| 2014/0134877 | A1 | 5/2014 | Rosenberger |
| 2018/0054018 | A1 | 2/2018 | Hagmann et al. |

ELECTRICAL MULTI-CONNECTOR FEEDTHROUGH PANEL AND METHOD THEREFOR

CROSS-REFERENCE TO RELATED APPLICATIONS

This application is a continuation of and claims the benefit of U.S. patent application Ser. No. 15/984,985 filed on May 21, 2018 (now U.S. Pat. No. 10,516,232 issued on Dec. 24, 2019), the disclosure of which is incorporated herein by reference in its entirety.

BACKGROUND

1. Field

The exemplary embodiments generally relate to electrical feedthroughs and more particularly to electrical feedthroughs for pressure vessels.

2. Brief Description of Related Developments

Generally, feedthroughs, such as for electrical wires, in a wall of a pressure vessel include a cutout sized and shaped for a single wire bundle/connector (i.e., the number of holes cut into the wall has a one to one correspondence with the number of feedthroughs passing through the wall). Each individual cutout requires surface preparation (e.g., for bonding an electrical connector to the wall, etc.) and potting for the respective electrical connector that is to be fitted to the individual cutout. The individual cutouts are spaced apart from one another by suitable distances to maintain structural loading specifications of the wall.

Further, a respective wire bundle is passed through the respective individual cutout until the connector end of the wire bundle butts up against the respective individual cutout. The connector end of the wire bundle is then coupled to the wall. Passing the respective wire bundle through the respective individual cutout may result in defects in the wire bundle that may require rework/repair of the wire bundle after installation, where the space (such as, e.g., within a wing of an aircraft) for maintenance personnel access to the wire bundle may be limited.

Generally the time required for preparing the surfaces of the wall around each individual cutout and potting each wire bundle connector end to the wall is not insignificant. Also, the time required for passing the wire bundles through the respective individual cutout is not insignificant, taking into account any reworking of the wire bundle that may result from feeding the wire bundle through the respective individual cutout.

SUMMARY

Accordingly, apparatuses and methods, intended to address or solve at least one or more of the above-identified problems or concerns, would find utility.

The following is a non-exhaustive list of examples, which may or may not be claimed, of the subject matter according to the present disclosure.

One example of the subject matter according to the present disclosure relates to an electrical multi-connector feedthrough panel for sealing a penetration in a structure across a pressure differential, the electrical multi-connector feedthrough panel comprising: a frame having a first environmental interface surface and a second environmental interface surface, the second environmental interface surface being opposite the first environmental interface surface and configured to couple with the structure so that the first environmental interface surface and the second environmental interface surface span the penetration so as to at least in part seal the penetration; and a plurality of electrical connector insert shells monolithically formed with the frame, each of the plurality of electrical connector insert shells being configured to sealingly couple with at least one electrical connector so as to seal the electrical connector insert shell; wherein: the first environmental interface surface being disposed between the plurality of connector shells so as to be in fluid communication with a first pressurized environment, and the second environmental interface surface being disposed between the plurality of connector shells so as to be in fluid communication with a second pressurized environment having a different pressure than the first pressurized environment.

Another example of the subject matter according to the present disclosure relates to an electrical multi-connector feedthrough panel for sealing a penetration in a structure across a pressure differential, the electrical multi-connector feedthrough panel comprising: a frame having a first environmental interface surface and a second environmental interface surface, the second environmental interface surface being opposite the first environmental interface surface and configured to couple with the structure so that the first environmental interface surface and the second environmental interface surface span the penetration; and a plurality of electrical connector shells monolithically formed with the frame, each of the plurality of electrical connector insert shells having a first end extending from the first environmental interface surface, a second end extending from the second environmental interface surface, where the first end is configured to sealingly receive a first electrical connector and the second end is configured to sealingly receive a second electrical connector so as to form a respective sealed connector shell, and an electrical connector insert retainer extending between the first end and the second end; wherein the first environmental interface surface and a portion of each of the sealed electrical connector shells extending from the first environmental interface surface are configured to be in fluid communication with a first pressurized environment, and the second environmental interface surface and another portion of each of the sealed electrical connector insert shells extending from the second environmental interface surface are configured to be in fluid communication with a second pressurized environment having a different pressure than the first pressurized environment.

Still another example of the subject matter according to the present disclosure relates to a method for sealing a penetration in a structure across a pressure differential, the method comprising: coupling an electrical multi-connector feedthrough panel to the structure so that a first environmental interface surface and a second environmental interface surface of a frame of the electrical multi-connector feedthrough panel span the penetration, where the second environmental interface surface is opposite the first environmental interface surface; wherein: electrical connector inserts are inserted into a plurality of electrical connector insert shells monolithically formed with the frame, the first environmental interface surface and a portion of each of the plurality of electrical connector insert shells extending from the first environmental interface surface are positioned relative to the penetration to be in fluid communication with a first pressurized environment, and the second environmental interface surface and another portion of each of the plurality of electrical connector insert shells extending from the second environmental interface surface are positioned relative to the penetration to be in fluid communication with a second pressurized environment having a different pressure than the first pressurized environment.

BRIEF DESCRIPTION OF THE DRAWINGS

Figure 1:
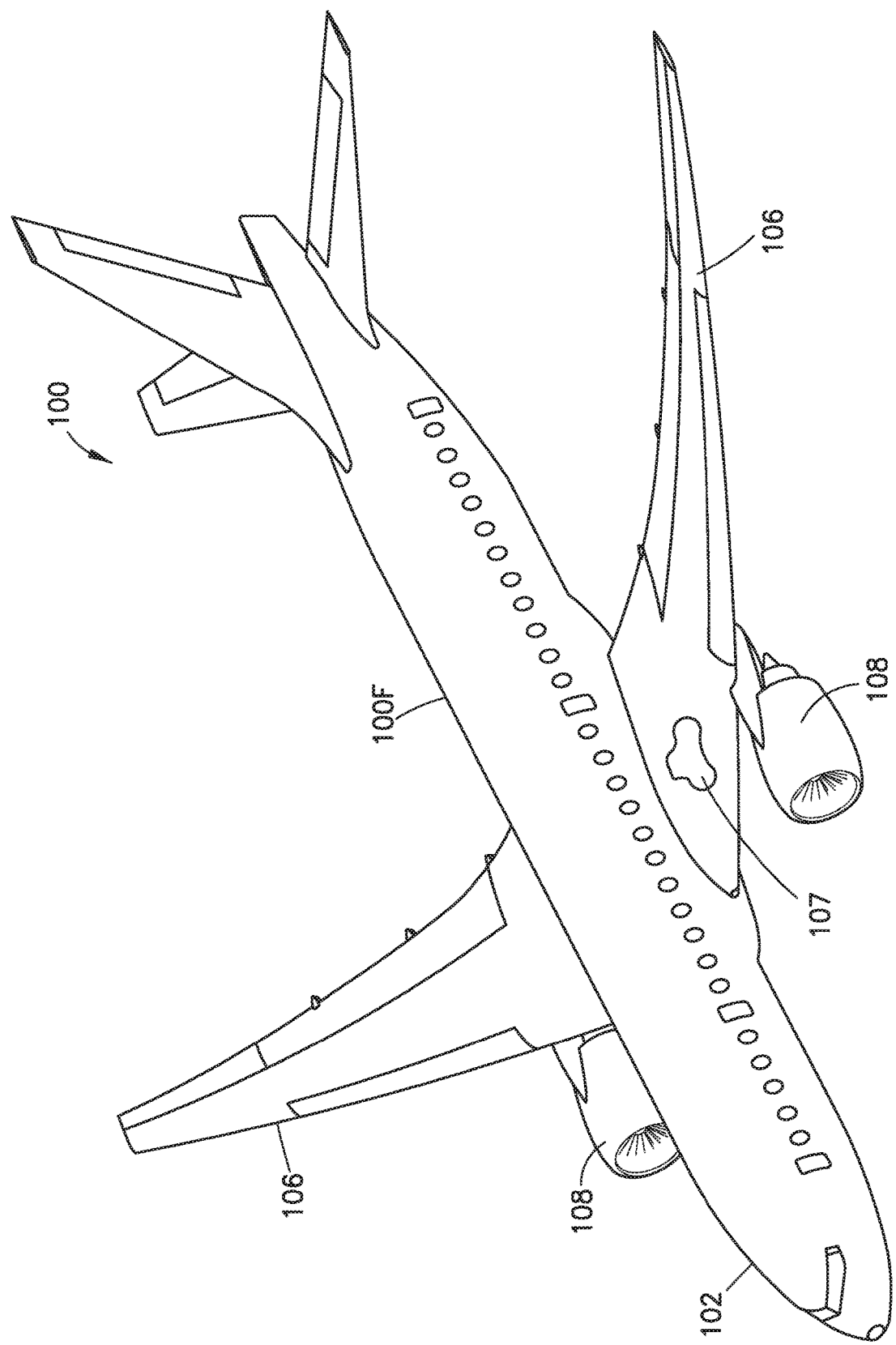
Figure 2:
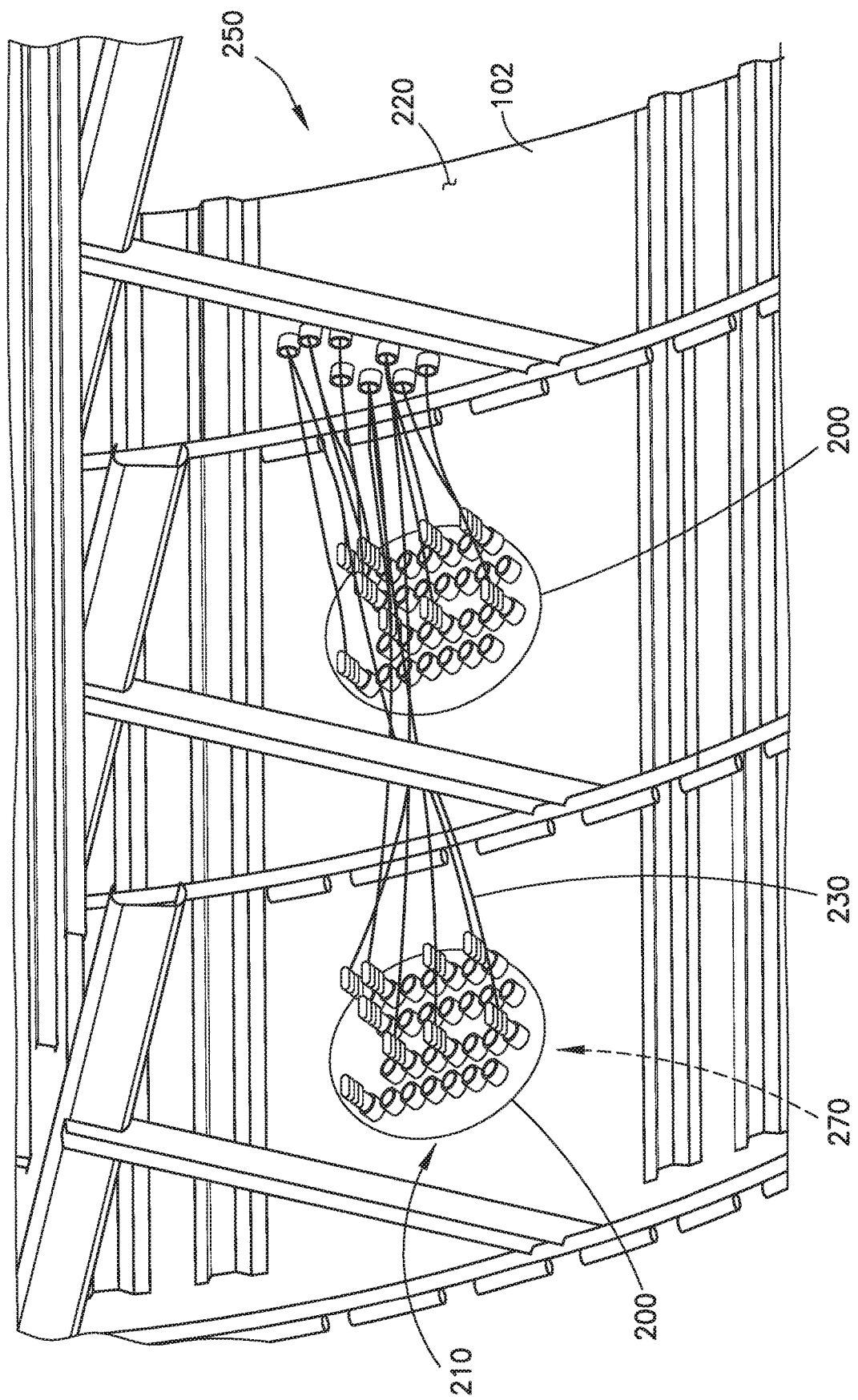
Figure 3:
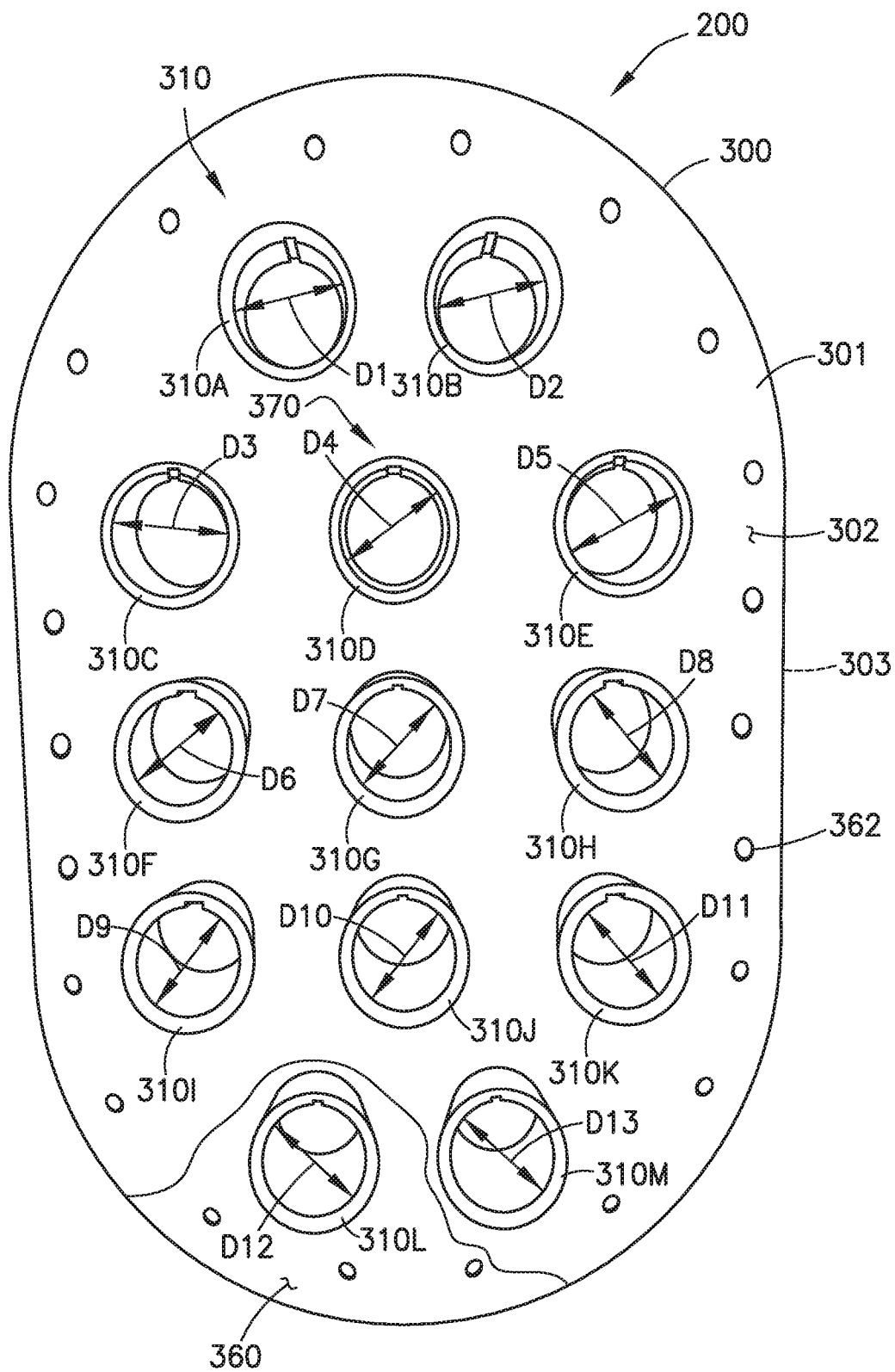
Figures 4A, 4B:
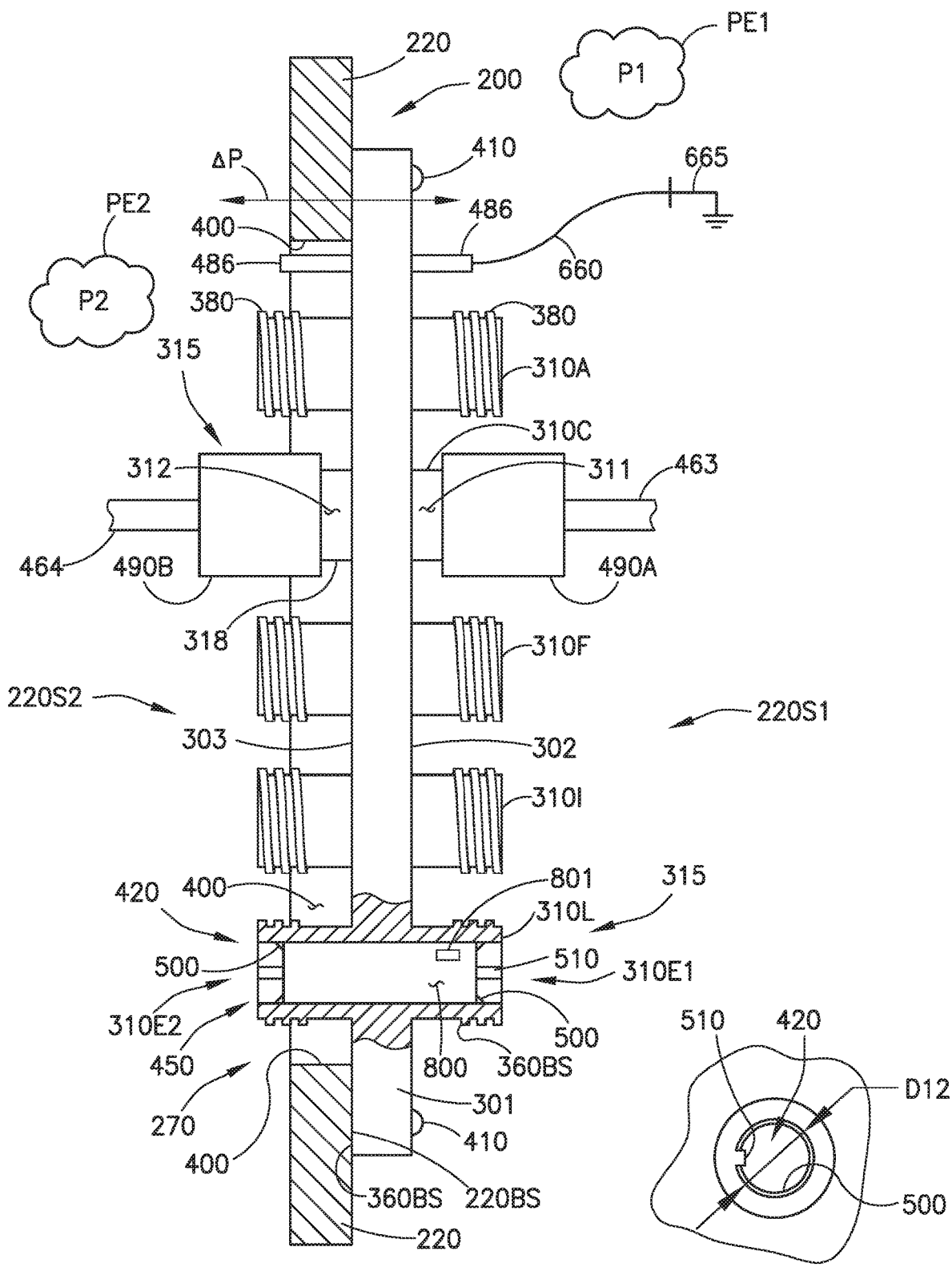
Figure 5:
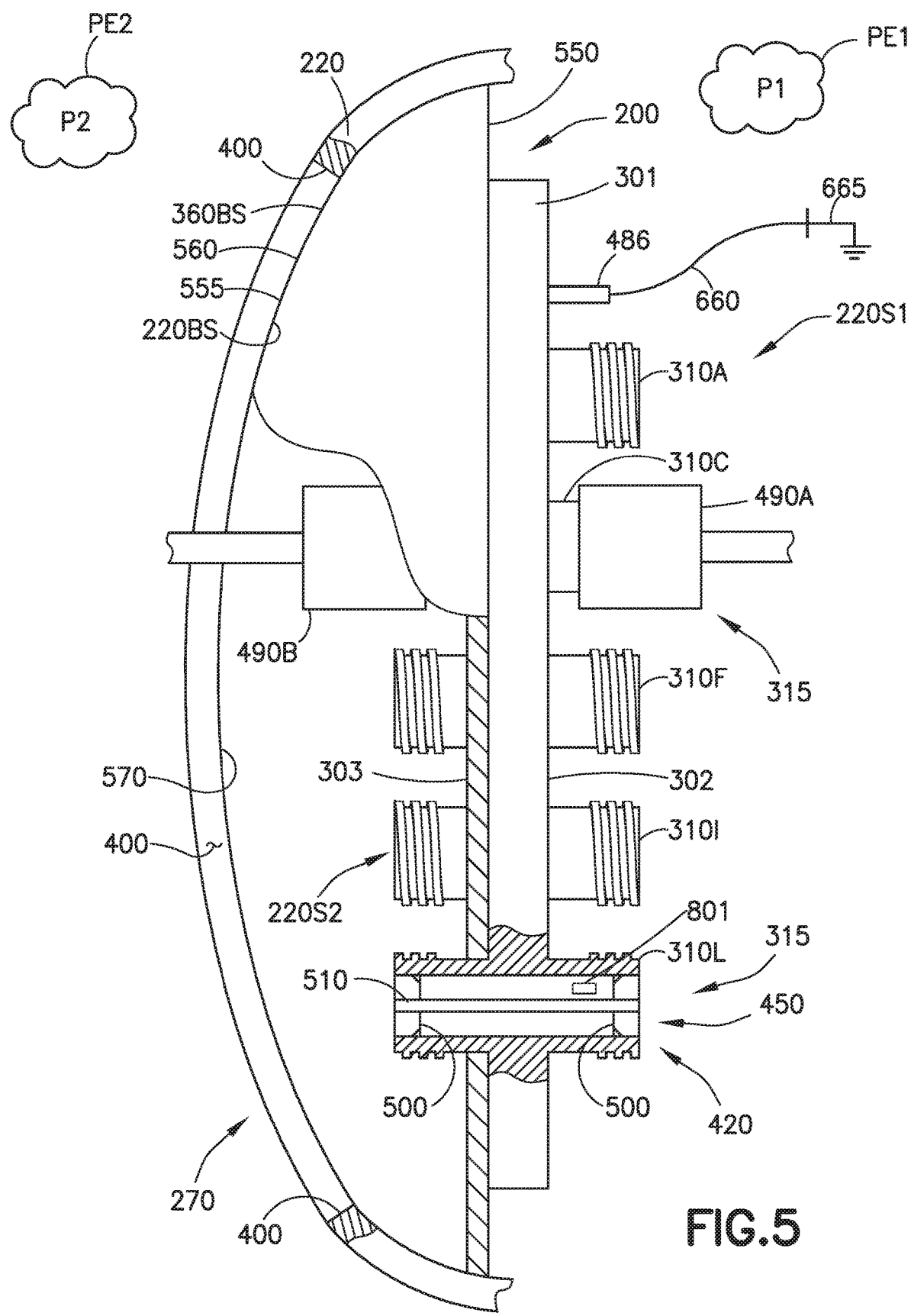
Figure 6:
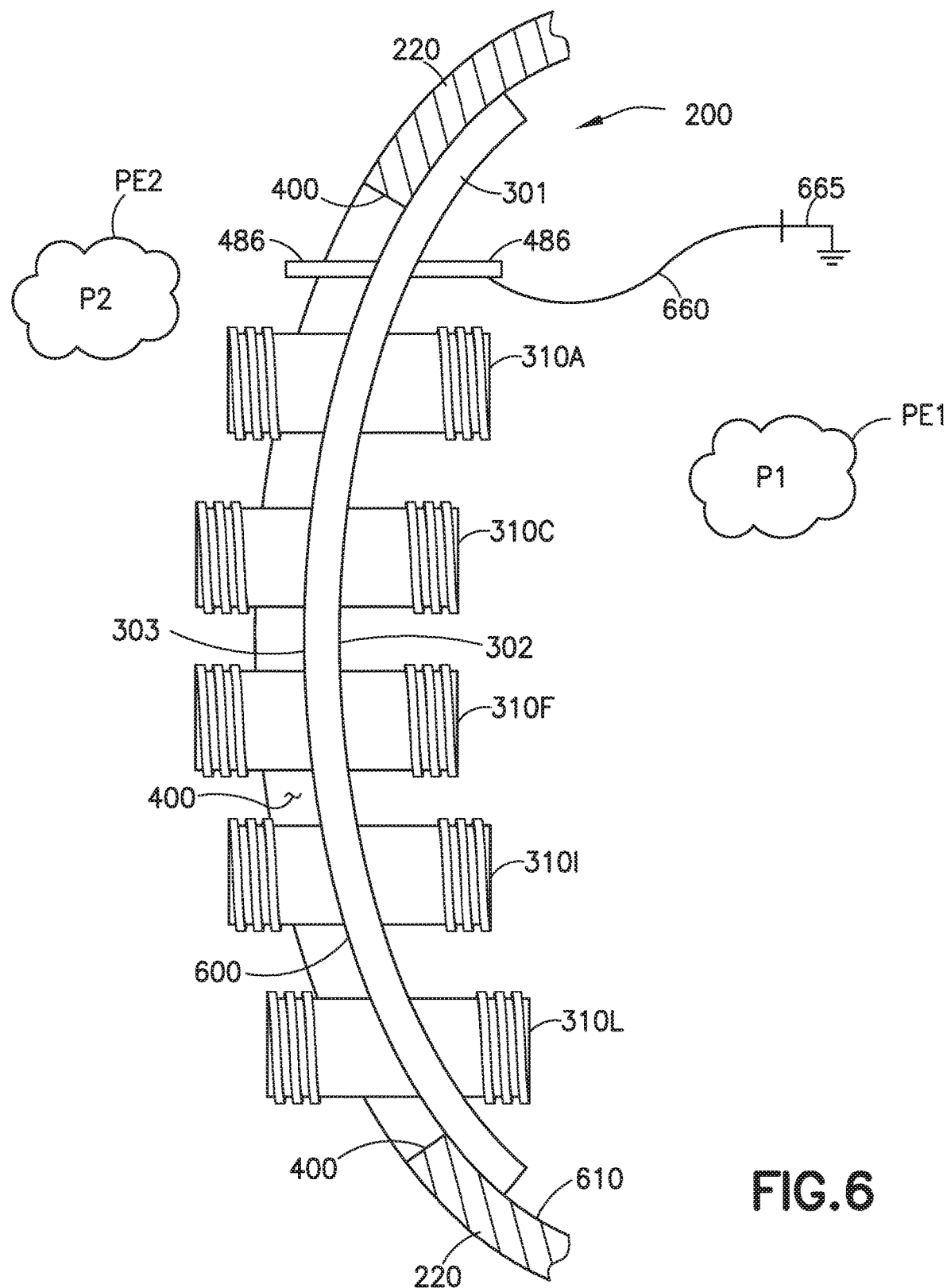
Figure 7:
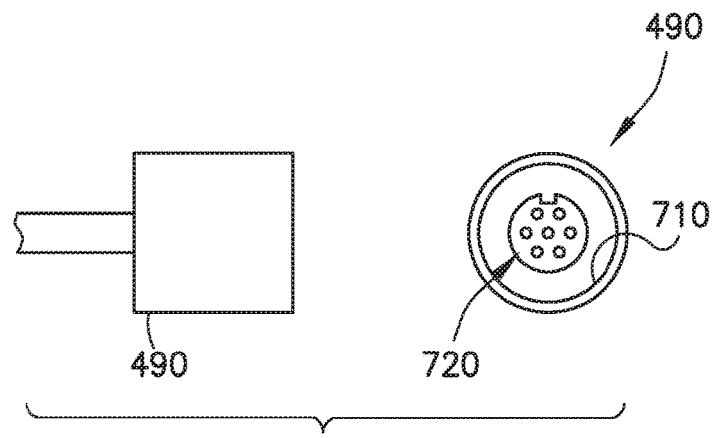
Figure 8:
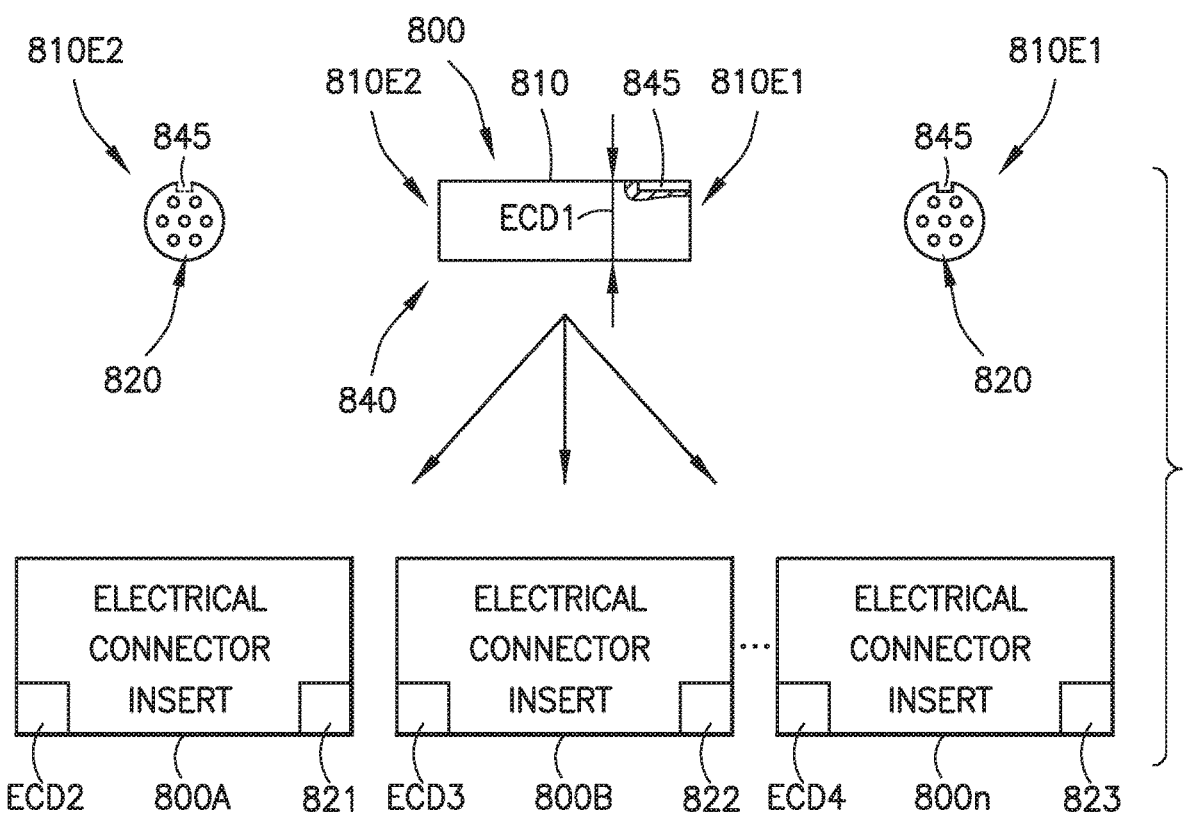
Figure 9:
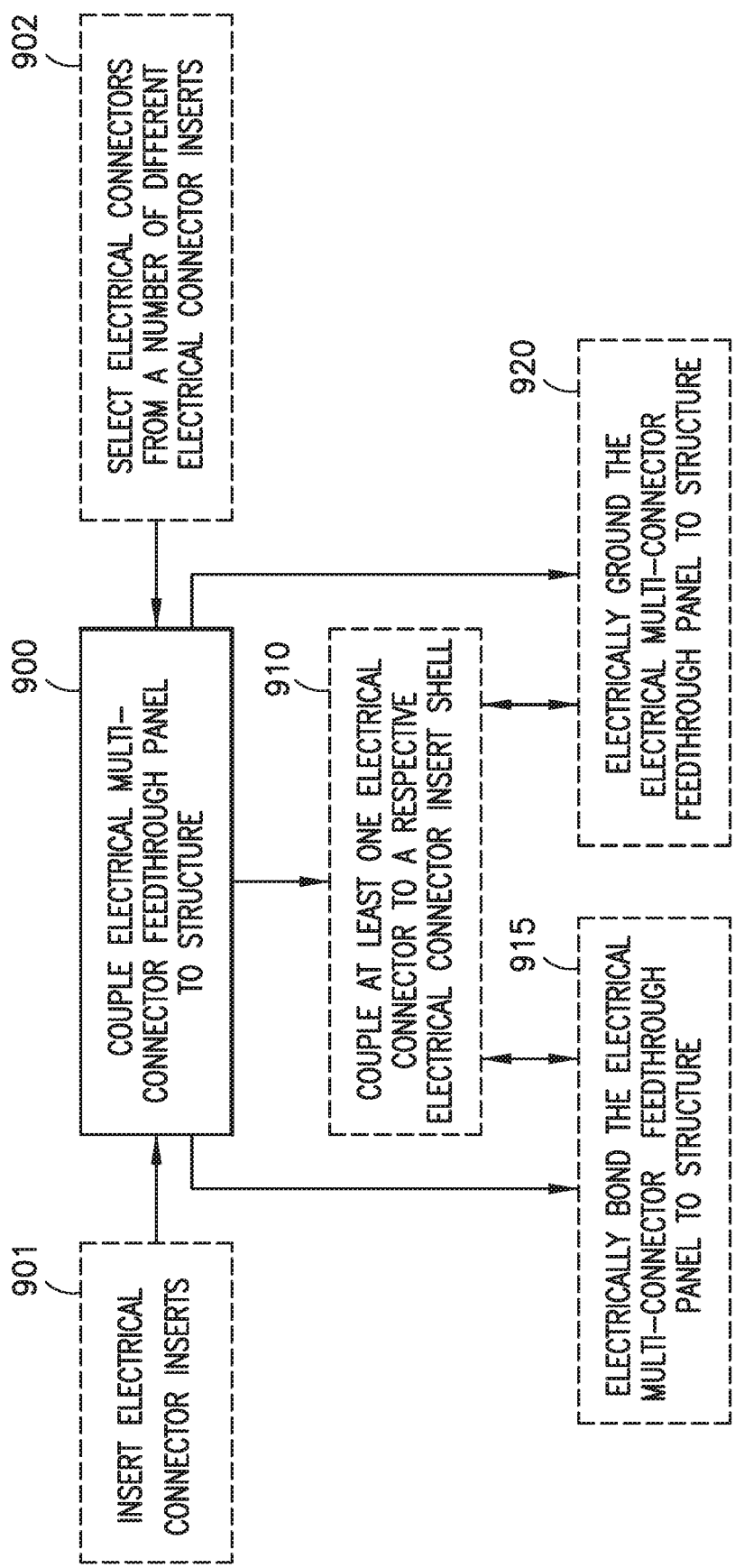

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a perspective view of an exemplary vehicle incorporating aspects of the present disclosure;

FIG. 2 is an exemplary illustration of an electrical multi-connector feedthrough panel coupled with a portion of the vehicle of FIG. 1 in accordance with aspects of the present disclosure;

FIG. 3 is an exemplary front view of the electrical multi-connector feedthrough panel of FIG. 2 in accordance with aspects of the present disclosure;

FIG. 4A is an exemplary side view of the electrical multi-connector feedthrough panel of FIG. 2 in accordance with aspects of the present disclosure;

FIG. 4B is an exemplary front view of a portion of the electrical multi-connector feedthrough panel of FIG. 4A in accordance with aspects of the present disclosure;

FIG. 5 is an exemplary illustration of a panel mount for the electrical multi-connector feedthrough panel of FIG. 2 in accordance with aspects of the present disclosure;

FIG. 6 is an exemplary side view of the electrical multi-connector feedthrough panel of FIG. 2 in accordance with aspects of the present disclosure;

FIG. 7 is an exemplary illustration of an electrical connector in accordance with aspects of the present disclosure;

FIG. 8 is an exemplary illustration of a front, side and back of an electrical connector insert selected from a number of different electrical connector inserts in accordance with aspects of the present disclosure; and FIG. 9 is an exemplary flow diagram of a method for sealing a penetration in a structure across a pressure differential in accordance with aspects of the present disclosure.

DETAILED DESCRIPTION

Referring to FIGS. 1 and 2, the aspects of the present disclosure provide for an electrical multi-connector feedthrough panel 200 that is configured to seal a penetration in a structure 220 (e.g., a skin) of a pressure vessel, such of a fuselage 102 of an aircraft 100 or other suitable vehicle. Other vehicles in which the aspects of the present disclosure may be applied are submersible vehicles, space vehicles or in any other non-vehicle applications where a penetration is made through a wall having differential pressure loading on opposite sides of the wall. For example, the aspects of the present disclosure will be described with respect to the aircraft 100 which includes a frame 100F that forms the fuselage 102. Wings 106 are coupled to the frame 100F and engines 108 are coupled to the wings 106. A portion of an interior 250 of the fuselage 102 is illustrated in FIG. 2 where the interior of the fuselage 102 is pressurized relative to an interior 107 of the wings 106. For exemplary purposes only, the electrical multi-connector feedthrough panel 200 may provide for the electrical coupling of wires from the interior 250 of the fuselage 102, through the structure 220, to an interior 107 of the wing 106.

Each electrical multi-connector feedthrough panel 200 coupled to the structure 220 is common to a plurality of electrical feedthrough connections 210. The electrical multi-connector feedthrough panel 200 may be coupled to the structure 220 to provide for reduced installation time for penetration connections. For example, each multi-connector feedthrough panel provides for a single penetration for the plurality of electrical feedthrough connections 210, where surface preparation of the structure for only the single penetration is performed, as opposed to surface preparation for separate cutouts for each of the electrical feedthrough connections 210. The electrical multi-connector feedthrough panel 200 provides for fewer penetrations through the structure 220 which may reduce the possibility of pressure leaks by reducing the possible areas a leak can form (i.e., a single penetration for the plurality of electrical feedthrough connections 210 rather than multiple penetrations where the number of penetrations and electrical feedthrough connections have a one to one correspondence). The electrical multi-connector feedthrough panel 200 may also reduce the installation time of wire bundles 230 as the wire bundles 230 are coupled to a respective side of the electrical multi-connector feedthrough panel 200, rather than being passed through a cutout in the structure 220. Reworking of the wire bundles 230 may also be reduced as the aspects of the present disclosure substantially eliminates the passage of the wire bundles 230 through a cutout in the structure 220. A part count for the electrical connections may also be reduced by the multi-connector feedthrough panel 200 as a number of seals for the penetrations through the structure 220 may be reduced from one seal for each of the electrical feedthrough connections to one seal of the electrical multi-connector feedthrough panel 200 (which provides for the plurality of electrical feedthrough connections 210).

Illustrative, non-exhaustive examples, which may or may not be claimed, of the subject matter according to the present disclosure are provided below.

Referring to FIGS. 2, 3 and 4A, the electrical multi-connector feedthrough panel 200 is configured for sealing a penetration 270 (FIG. 4A) in a structure 220 across a pressure differential ΔP. The electrical multi-connector feedthrough panel 200 has a frame 301 having a first environmental interface surface 302 and a second environmental interface surface 303. The second environmental interface surface 303 is opposite the first environmental interface surface 302 and is configured to couple with the structure 220 so that the first environmental interface surface 302 and the second environmental interface surface 303 span the penetration 270 so as to at least in part seal the penetration 270. As illustrated in FIG. 4A, a first pressure P1 may be present on a first side 220S1 of the structure and a second pressure P2 may be present on a second side 220S2 of the structure 220. The electrical multi-connector feedthrough panel 200 may be coupled to the side (e.g., the first side 220S1 or the second side 220S2) of the structure on which the greater pressure P1, P2 is exerted in instances when there is a pressure differential (e.g., such as when the portion of an interior 250 of the fuselage 102 has been pressurized). For example, in FIG. 4A, the electrical multi-connector feedthrough panel 200 is shown illustrated as being coupled to first side 220S1 of the structure 220 where the pressure P1 is greater than the pressure P2. Here the electrical multi-connector feedthrough panel 200 has a perimeter 300 that is larger than a perimeter 400 of the penetration 270 so that a pressure load exerted on the electrical multi-connector feedthrough panel 200 by the higher first pressure environment PE1 is mainly reacted (i.e., a reaction pressure load is generated in response to the pressure load exerted on the electrical multi-connector feedthrough panel 200 by the higher first pressure environment PE1 (e.g., such that the perimeter 300 is pressed against the structure 220) rather than by any mechanical or chemical fasteners coupling the electrical multi-connector feedthrough panel 200 to the structure 220. However, where suitable chemical and/or mechanical fasteners 410 are provided, the electrical multi-connector feedthrough panel 200 may be coupled to the side of the structure 220 on which the lesser pressure P2 is present (opposite to that shown in FIG. 4A). It should be noted, however, that the chemical and/or mechanical fasteners 410 may also be used when the electrical multi-connector feedthrough panel 200 is coupled to the side of the structure 220 on which the greater pressure P1 is present (as shown in FIG. 4A). The frame 301 may include any suitable number of fastener apertures 362 disposed about a perimeter 300 of the frame, where the fastener apertures 362 are shaped and sized so that mechanical fasteners 410 (FIG. 4A) can pass there through to couple the electrical multi-connector feedthrough panel 200 to the structure 220 (with or without the use of chemical fasteners).

Still referring to FIGS. 3 and 4A, the electrical multi-connector feedthrough panel 200 also includes a plurality of electrical connector insert shells 310 monolithically formed with the frame 301. Thirteen electrical connector insert shells 310A-310M are illustrated in FIG. 3 for exemplary purposes; however, in other aspects the electrical multi-connector feedthrough panel 200 may have more or fewer than thirteen electrical connector shells. The first environmental interface surface 302 is disposed between the plurality of electrical connector insert shells 310 so as to be in fluid communication with a first pressurized environment PE1. More specifically, the first environmental interface surface 302 and a portion 311 (FIG. 4A) of each of the electrical connector insert shells 310 extending from the first environmental interface surface 302 are configured to be in fluid communication with the first pressurized environment PE1. The second environmental interface surface 303 is disposed between the plurality of electrical connector insert shells 310, so as to be in fluid communication with a second pressurized environment PE2 having a different pressure (e.g., the second pressure P2) than the pressure (e.g., the first pressure P1) within the first pressurized environment PE1. More specifically, the second environmental interface surface 303 and another portion 312 of each of the electrical connector insert shells 310 extending from the second environmental interface surface 303 are configured to be in fluid communication with the second pressurized environment PE2.

At least the frame 301 is configured to electrically bond with the structure 220. For example, the frame 301 and the plurality of electrical connector insert shells 310 comprise one or more of a plastic, a composite, and a metal. Where the frame 301 comprises a plastic and/or a composite (or even when the frame 301 comprises a metal), the frame 301 and the plurality of electrical connector insert shells 310 comprise an electrically conductive coating 360 (a portion of the electrically conductive coating 360 is illustrated in FIG. 3). The electrically conductive coating 360 may be a metallic coating, such as a nickel coating, or any other suitable coating that is electrically conductive. The electrically conductive coating 360, such as the metallic coating, forms an electrical bonding surface 360BS (FIG. 4A) that extends along one or more surfaces of the electrical multi-connector feedthrough panel 200 for bonding the at least one electrical connector 490A, 490B to the electrical multi-connector feedthrough panel 200. The electrical bonding surface 360BS also bonds the electrical multi-connector feedthrough panel 200 to a corresponding bonding surface 220BS of the structure, such as around a perimeter 400 of the penetration 270.

Each electrical connector insert shell 310A-310M has a first end 310E1 (see FIG. 4A, e.g., electrical connector insert shell 310L) extending from the first environmental interface surface 302. Each electrical connector insert shell 310A-310M also has a second end 310E2 (see FIG. 4A, e.g., electrical connector insert shell 310L) extending from the second environmental interface surface 303. Each of the plurality of electrical connector insert shells 310A-310M is configured to sealingly couple with at least one electrical connector 490A, 490B (see also electrical connector 490 in FIG. 7), so as to seal the electrical connector insert shell 310A-310M. For example, the first end 310E1 is configured to sealingly receive a first electrical connector 490A (see also electrical connector 490 in FIG. 7) and the second end 310E2 is configured to sealingly receive a second electrical connector 490B (see also electrical connector 490 in FIG. 7), so as to form a respective sealed electrical connector insert shell 315, where the term "sealed" means that there is substantially no fluid leakage through the sealed electrical connector insert shell 315 due to the pressure differential between pressure P1 in the first pressurized environment PE land pressure P2 in the second pressurized environment PE2. Here, each of the first end 310E1 and the second end 310E2 include external threads 380 configured to couple with mating threads 710 (FIG. 7) of a respective one of the first electrical connector 490A and the second electrical connector 490B. In other aspects, any suitable coupling members (e.g., snaps, clips, etc.) may be provided on one or more of the first end 310E1 and the second end 310E2 for coupling with mating coupling members of the respective one of the first electrical connector 490A and the second electrical connector 490B, so as to form the respective sealed electrical connector insert shell 315. In other aspects, as described below the electrical connector insert shell 310 may be sealed, such as by an electrical connector insert 800 (see also FIG. 8), regardless of whether the electrical connector(s) 490 is coupled to the electrical connector insert shell 310.

Referring to FIG. 3, in one aspect, at least one electrical connector insert shell 310A-310M of the plurality of electrical connector insert shells 310 comprises a circular cross section 370. Each of the electrical connector insert shells 310A-310M has a respective diameter D1-D31 (see also FIG. 4B). At least one electrical connector insert shell 310A-310M of the plurality of electrical connector insert shells 310 comprises a different diameter D1-D13 than another electrical connector insert shell 310A-310M of the plurality of electrical connector insert shells 310. In another aspect, one or more of the electrical connector insert shells 310A-310M may have a non-circular cross section (such as square, rectangular, etc.).

Referring now to FIGS. 4A, 4B and 5, each electrical connector insert shell 310A-310M has an electrical connector insert retainer 450 extending between the first end 310E1 and the second end 310E2. The electrical connector insert retainer 450 includes an aperture 420 that extends between the first end 310E1 and the second end 310E2 of the respective electrical connector insert shell 310A-310M (see electrical connector insert shell 310L for exemplary purposes). At least one resilient member 500 is disposed within the aperture 420 and is configured to couple with and retain an electrical connector insert 800 (see also FIG. 8) within the aperture 420. In one aspect, the electrical connector insert 800 may include any suitable seal(s) 801 for sealing the respective electrical connector insert shell 310A-310M so that there is substantially no fluid leakage through the respective electrical connector insert shell 310A-310M, such as when the electrical connector(s) 490 (e.g., the first electrical connector 490A and the second electrical connector 490B) is/are not coupled to the respective electrical connector insert shell 310A-310M. Here, coupling of the electrical connector insert 800 with the respective electrical connector insert shell 310A-310M forms the respective sealed electrical connector insert shell 315 regardless of whether electrical connector(s) 490 are coupled to the respective electrical connector insert shell 310A-310M. In one aspect there is a resilient member 500 adjacent each of the first end 310E1 and the second end 310E2 so that the electrical connector insert 800 can be inserted into the aperture 420 from one of both the first end 310E1 and the second end 310E2; while in other aspects there may be one resilient member 500 adjacent one of the first end 310E1 and the second end 310E2 and a rigid stop member or flange at the other one of the first end 310E1 and second end 310E2, so that the electrical connector insert 800 is inserted from only one of the first end 310E1 and second end 310E2. The resilient member 500 may be any suitable clip, tap, etc. that flexes radially outwardly, so that the electrical connector insert 800 passes by the resilient member 500 for insertion into the aperture 420, and then returns to its original position so as to retain the electrical connector insert 800 within the aperture 420. In other aspects, the resilient member may be a removable spring clip that is positioned within a slot in the aperture 420 for retaining the electrical connector insert 800. A rotational orientation member 510 may also be disposed within the aperture 420 and configured to couple with one or more of the electrical connector insert 800 and the at least one electrical connector 490A, 490B, so that the at least one electrical connector 490A, 490B is aligned with the electrical connector insert 800 upon coupling of the at least one electrical connector 490A, 490B with the respective electrical connector insert shell 310A-310M.

Referring to FIGS. 4A and 8, the at least one electrical connector insert 800 is configured for insertion into a respective electrical connector insert shell 310A-310M. For example, as noted above, the electrical connector insert 800 includes a body 810 having a first end 810E1 and a second end 810E2. The body includes an alignment groove or recess 845 that couples with the rotational orientation member 510 of the aperture 420 for rotationally aligning the electrical connector insert 800 within the aperture 420. Each of the first end 810E1 and second end 810E2 has a contact pin pattern 820 that corresponds with a mating contact pin pattern 720 (FIG. 7) of a respective electrical connector 490 (FIG. 7). In one aspect, the at least one electrical connector insert 800 that is inserted into the respective electrical connector insert shell 310A-310M is selected from a number of different electrical connector inserts 800A, 800B-800n. At least one of the different electrical connector inserts 800A, 800B-800n has a different predetermined characteristic than another of the different electrical connector inserts 800A, 800B-800n. For example, the different predetermined characteristic is the contact pin pattern 820-823 (where there are multiple different contact pin patterns 820-823, each corresponding with a mating contact pin pattern 720 of the respective electrical connector 490 (FIG. 7)), or any other suitable characteristic, such as a diameter ECD1-ECD4 or cross sectional shape of the electrical connector insert 800, where the diameter ECD1-ECD4 (or cross sectional shape) corresponds with one or more diameters D1-D13 (or cross sectional shapes) of the electrical connector insert shells 310A-310M. In other aspects, the electrical connector insert 800 may all be substantially similar (e.g., a common electrical connector insert).

As can be seen in FIG. 8, the electrical connector insert 800 comprises a connector insert 840 to which terminal ends of wiring harnesses 463, 464 (such as the ends including the electrical connectors 490A, 490B) are coupled to each other through the electrical connector insert 800. The connector insert 840 may be referred to as a butt connector insert to which the terminal ends of the wiring harness 463, 464 are coupled to, in effect, butt the terminal ends of the wiring harnesses to each other. Here the electrical connector insert shells 310A-310M also form an electrical connector shell 318 (FIG. 4A—which may be referred to as a butt connector shell), where the terminal ends of the wiring harnesses 463, 464 (such as the ends including the electrical connectors 490A, 490B) are coupled to each other by coupling each electrical connector 490A, 490B to a respective one of the first end 310E1 and the second end 310E2, so that the electrical connectors 490A, 490B are in electrical communication with each other through the electrical connector insert 800.

Referring now to FIG. 5, in one aspect, the electrical multi-connector feedthrough panel 200 includes a panel mount 550 coupled to the frame 301. The panel mount 550 includes a structure interface coupling surface 555 that has a contour 560 corresponding to a contour 570 of the structure 220. The panel mount 550 includes the electrical bonding surface 360BS (which may be a common bonding surface with the frame 301) that is bonded to the corresponding bonding surface 220BS of the structure in a manner similar to that described above with respect to FIG. 4A. The panel mount 550 is configured to circumscribe the perimeter 400 of the penetration 270 so as to, with the sealed electrical connector insert shells 315, seal the penetration 270. In other aspects, referring to FIG. 6 (and FIG. 4A), the frame 301 has a contour 600 that corresponds with a contour 610 of the structure 220.

Referring to FIGS. 4A, 5, and 6, in addition to, or in lieu of the bonding between the frame 301 (and/or the panel mount 550) and the structure 220, the electrical multi-connector feedthrough panel 200 includes an electrical grounding member 486 extending from one or more of the first environmental interface surface 302 and the second environmental interface surface 303. The electrical grounding member 486 is electrically coupled to each of the electrical connector insert shells 310A-310M through, for example, the electrically conductive coating 360 (FIG. 3). The electrical grounding member 486 is coupled to any suitable electrical ground 665 of the aircraft 100 (FIG. 1) with any suitable ground strap/wire 660 so as to electrically ground the electrical multi-connector feedthrough panel 200 and the electrical connectors 490, 490A, 490B (FIGS. 4A, 5, and 7) coupled to the respective electrical connector insert shells 310A-310M.

Referring to FIGS. 3, 4A, 5, 6, and 9, an exemplary method for sealing a penetration 270 in a structure 220 across a pressure differential ΔP will be described. The method includes coupling the electrical multi-connector feedthrough panel 200 to the structure 220 (FIG. 9, Block 900) so that the first environmental interface surface 302 and the second environmental interface surface 303 of the frame 301 of the electrical multi-connector feedthrough panel 200 span the penetration 270. As noted above, the second environmental interface surface 303 is opposite the first environmental interface surface 302, so as to be disposed in the respective one of the first pressure environment PE1 and the second pressure environment PE2. In one aspect, the electrical connector inserts 800 are inserted (FIG. 9, Block 901) into the plurality of electrical connector insert shells 310A-310M which are monolithically formed with the frame 301; while in other aspects, the electrical connector inserts 800 may be pre-installed in the plurality of electrical connector insert shells 310A-310M prior to coupling of the electrical multi-connector feedthrough panel 200 to the structure 220. The electrical connector inserts 800, 800A, 800B-800$n$ may be selected from a number of different electrical connector inserts 800, 800A, 800B-800$n$ (FIG. 9, Block 902). As described above, at least one of the different electrical connector inserts 800, 800A, 800B-800$n$ has a different predetermined characteristic than another of the different electrical connector inserts 800, 800A, 800B-800$n$.

As described herein, the first environmental interface surface 302 and a portion 311 of each of the electrical connector insert shells 310A-310M extending from the first environmental interface surface 302 are positioned relative to the penetration 270 to be in fluid communication with the first pressurized environment PE1. Similarly, the second environmental interface surface 303 and another portion 312 of each of the electrical connector insert shells 310A-310M extending from the second environmental interface surface 303 are positioned relative to the penetration 270 to be in fluid communication with the second pressurized environment PE2 having a different pressure P1 than the first pressurized environment PE1.

The method may also include coupling at least one electrical connector 490 (FIG. 7), 490A, 490B to a respective electrical connector insert shell 310A-310M (FIG. 9, Block 910), to seal the at least one electrical connector so that there is substantially no fluid leakage through the at least one electrical connector as described above. The at least one electrical connector 490, 490A, 490B is electrically bonded to the respective electrical connector insert shell 310A-310M as described above. The electrical multi-connector feedthrough panel 200 may be electrically bonded to the structure 220 (FIG. 9, Block 915) in any suitable manner. For example, at least one of the first environmental interface surface 302 and the second environmental interface surface 303 may be electrically bonded to the structure 220 as described above. The electrical multi-connector feedthrough panel 200 may also be electrically grounded to the structure 220 (FIG. 9, Block 920). For example, the electrical multi-connector feedthrough panel 200 may be coupled to an electrical ground 665 of the aircraft 100 (FIG. 1) through an electrical grounding member 486 extending from one or more of the first environmental interface surface 302 and the second environmental interface surface 303 as described above.

The following are provided in accordance with the aspects of the present disclosure:

A1. An electrical multi-connector feedthrough panel for sealing a penetration in a structure across a pressure differential, the electrical multi-connector feedthrough panel comprising:

a frame having a first environmental interface surface and a second environmental interface surface, the second environmental interface surface being opposite the first environmental interface surface and configured to couple with the structure so that the first environmental interface surface and the second environmental interface surface span the penetration; and a plurality of electrical connector shells monolithically formed with the frame, each of the plurality of electrical connector insert shells having a first end extending from the first environmental interface surface, a second end extending from the second environmental interface surface, where the first end is configured to sealingly receive a first electrical connector and the second end is configured to sealingly receive a second electrical connector so as to form a respective sealed connector shell, and an electrical connector insert retainer extending between the first end and the second end;

wherein the first environmental interface surface and a portion of each of the sealed electrical connector shells extending from the first environmental interface surface are configured to be in fluid communication with a first pressurized environment, and the second environmental interface surface and another portion of each of the sealed electrical connector insert shells extending from the second environmental interface surface are configured to be in fluid communication with a second pressurized environment having a different pressure than the first pressurized environment.

A2. The electrical multi-connector feedthrough panel of paragraph A1, further comprising a panel mount coupled to the frame, the panel mount having a structure interface coupling surface that has a contour corresponding to a contour of the structure.

A3. The electrical multi-connector feedthrough panel of paragraph A1, wherein the frame has a contour that corresponds with a contour of the structure.

A4. The electrical multi-connector feedthrough panel of any one of paragraphs A1-A3, wherein the first end of the connector shell includes external threads.

A5. The electrical multi-connector feedthrough panel of any one of paragraphs A1-A4, wherein the second end of the connector shell includes external threads.

A6. The electrical multi-connector feedthrough panel of any one of paragraphs A1-A5, wherein the electrical connector insert retainer comprises:

an aperture that extends between the first end and the second end;

a resilient member configured to couple with and retain an electrical connector insert within the aperture; and a rotational orientation member configured to couple with one or more of the electrical connector insert, the first electrical connector, and the second electrical connector.

A7. The electrical multi-connector feedthrough panel of any one of paragraphs A1-A6, wherein the frame and the plurality of electrical connector insert shells comprise an electrically conductive coating.

A8. The electrical multi-connector feedthrough panel of any one of paragraphs A1-A7, wherein the frame and the plurality of electrical connector insert shells comprise a plastic.

A9. The electrical multi-connector feedthrough panel of any one of paragraphs A1-A7, wherein the frame and the plurality of electrical connector insert shells comprise a composite.

A10. The electrical multi-connector feedthrough panel of any one of paragraphs A1-A9, wherein the frame and the plurality of electrical connector insert shells comprise a metallic coating so as to form an electrical bonding surface.

A11. The electrical multi-connector feedthrough panel of any one of paragraphs A1-A10, wherein the frame and the plurality of electrical connector insert shells comprise a metal.

A12. The electrical multi-connector feedthrough panel of any one of paragraphs A1-A11, further comprising an electrical grounding member extending from one or more of the first environmental interface surface and the second environmental interface surface.

A13. The electrical multi-connector feedthrough panel of any one of paragraphs A1-A12, wherein the frame is configured to electrically bond with the structure.

A14. The electrical multi-connector feedthrough panel of any one of paragraphs A1-A13, wherein at least one electrical connector insert shell of the plurality of electrical connector insert shells comprises a circular cross section.

A15. The electrical multi-connector feedthrough panel of any one of paragraphs A1-A14, wherein at least one electrical connector insert shell of the plurality of electrical connector insert shells comprises a different diameter than another electrical connector insert shell of the plurality of electrical connector insert shells.

A16. The electrical multi-connector feedthrough panel of any one of paragraphs A1-A15, wherein the electrical connector shells comprise electrical butt connector shells configured to receive electrical butt connectors.

B1. An electrical multi-connector feedthrough panel for sealing a penetration in a structure across a pressure differential, the electrical multi-connector feedthrough panel comprising:
a frame having a first environmental interface surface and a second environmental interface surface, the second environmental interface surface being opposite the first environmental interface surface and configured to couple with the structure so that the first environmental interface surface and the second environmental interface surface span the penetration so as to at least in part seal the penetration; and
a plurality of electrical connector insert shells monolithically formed with the frame, each of the plurality of electrical connector insert shells being configured to sealingly couple with at least one electrical connector so as to seal the electrical connector insert shell;
wherein:
the first environmental interface surface being disposed between the plurality of electrical connector insert shells so as to be in fluid communication with a first pressurized environment, and
the second environmental interface surface being disposed between the plurality of electrical connector insert shells so as to be in fluid communication with a second pressurized environment having a different pressure than the first pressurized environment.

B2. The electrical multi-connector feedthrough panel of paragraph B1, further comprising at least one electrical connector insert configured for insertion into a respective electrical connector insert shell.

B3. The electrical multi-connector feedthrough panel of paragraph B2, wherein the at least one electrical connector insert is selected from a number of different electrical connector inserts, at least one of the different electrical connector inserts has a different predetermined characteristic than another of the different electrical connector inserts.

B4. The electrical multi-connector feedthrough panel of paragraph B3, wherein the different predetermined characteristic is a contact pin pattern.

B5. The electrical multi-connector feedthrough panel of paragraph B2, wherein the at least one electrical connector insert comprises a butt connector insert.

B6. The electrical multi-connector feedthrough panel of any one of paragraphs B1-B5, further comprising a panel mount coupled to the frame, the panel mount having a structure interface coupling surface that has a contour corresponding to a contour of the structure.

B7. The electrical multi-connector feedthrough panel of any one of paragraphs B1-B5, wherein the frame has a contour that corresponds with a contour of the structure.

B8. The electrical multi-connector feedthrough panel of any one of paragraphs B1-B7, wherein each electrical connector insert shell has a first end that includes external threads.

B9. The electrical multi-connector feedthrough panel of any one of paragraphs B1-B8, wherein each electrical connector insert shell has a second end that includes external threads.

B10. The electrical multi-connector feedthrough panel of any one of paragraphs B1-B9, wherein each electrical connector insert shell includes an electrical connector insert retainer, the electrical connector insert retainer comprising:
an aperture that extends between a first end and a second end of the electrical connector insert shell;
a resilient member configured to couple with and retain an electrical connector insert within the aperture; and
a rotational orientation member configured to couple with one or more of the electrical connector insert and the at least one electrical connector.

B11. The electrical multi-connector feedthrough panel of any one of paragraphs B1-B10, wherein the frame and the plurality of electrical connector insert shells comprise a plastic.

B12. The electrical multi-connector feedthrough panel of any one of paragraphs B1-B10, wherein the frame and the plurality of electrical connector insert shells comprise a composite.

B13. The electrical multi-connector feedthrough panel of any one of paragraphs B1-B10, wherein the frame and the plurality of electrical connector insert shells comprise a metal.

B14. The electrical multi-connector feedthrough panel of any one of paragraphs B1-B13, wherein the frame and the plurality of electrical connector insert shells comprise a metallic coating B15. The electrical multi-connector feedthrough panel of paragraph B14, wherein the metallic coating is electrically conductive.

B16. The electrical multi-connector feedthrough panel of paragraph B14, wherein the metallic coating is a nickel coating.

B17. The electrical multi-connector feedthrough panel of paragraph B14, wherein the metallic coating forms an electrical bonding surface for the at least one electrical connector.

B18. The electrical multi-connector feedthrough panel of any one of paragraphs B1-B13, wherein the frame and the plurality of electrical connector insert shells comprise an electrically conductive coating.

B19. The electrical multi-connector feedthrough panel of any one of paragraphs B1-B18, further comprising an electrical grounding member extending from one or more of the first environmental interface surface and the second environmental interface surface.

B20. The electrical multi-connector feedthrough panel of any one of paragraphs B1-B19, wherein the frame is configured to electrically bond with the structure.

B21. The electrical multi-connector feedthrough panel of any one of paragraphs B1-B20, wherein at least one electrical connector insert shell of the plurality of electrical connector insert shells comprises a circular cross section.

B22. The electrical multi-connector feedthrough panel of any one of paragraphs B1-B21, wherein at least one electrical connector insert shell of the plurality of electrical connector insert shells comprises a different diameter than another electrical connector insert shell of the plurality of electrical connector insert shells.

B23. The electrical multi-connector feedthrough panel of any one of paragraphs B1-B22, wherein one or more of the plurality of electrical connector insert shells comprise electrical butt connector shells configured to receive electrical butt connectors.

C1. A method for sealing a penetration in a structure across a pressure differential, the method comprising:
coupling an electrical multi-connector feedthrough panel to the structure so that a first environmental interface surface and a second environmental interface surface of a frame of the electrical multi-connector feedthrough panel span the penetration, where the second environmental interface surface is opposite the first environmental interface surface;
wherein:
electrical connector inserts are inserted into a plurality of electrical connector insert shells monolithically formed with the frame,
the first environmental interface surface and a portion of each of the plurality of electrical connector insert shells extending from the first environmental interface surface are positioned relative to the penetration to be in fluid communication with a first pressurized environment, and
the second environmental interface surface and another portion of each of the plurality of electrical connector insert shells extending from the second environmental interface surface are positioned relative to the penetration to be in fluid communication with a second pressurized environment having a different pressure than the first pressurized environment.

C2. The method of paragraph C1, further comprising coupling at least one electrical connector to a respective electrical connector insert shell where the at least one electrical connector is electrically bonded to the respective electrical connector insert shell.

C3. The method of any one of paragraphs C1-C2, further comprising electrically bonding at least one of the first environmental interface surface and the second environmental interface surface to the structure.

C4. The method of any one of paragraphs C1-C3, further comprising electrically grounding the electrical multi-connector feedthrough panel to an electrical ground through an electrical grounding member extending from one or more of the first environmental interface surface and the second environmental interface surface.

C5. The method of any one of paragraphs C1-C4, wherein the electrical connector inserts are selected from a number of different electrical connector inserts, at least one of the different electrical connector inserts has a different predetermined characteristic than another of the different electrical connector inserts.

C6. The method of paragraph C5, wherein the different predetermined characteristic is a contact pin pattern.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 9, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 9 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure

What is claimed is:

1. An electrical multi-connector feedthrough panel comprising:
a frame configured to couple with a structure and to seal, at least in part, a penetration in the structure across a pressure differential, wherein a first pressurized environment is disposed on one side of the sealed penetration, and wherein a second pressurized environment, different than the first pressurized environment, is disposed on an opposite side of the sealed penetration;
a plurality of electrical connector insert shells monolithically formed with the frame, each of the plurality of electrical connector insert shells protruding from opposite sides of the frame to form a respective passage through the frame and being configured to sealingly couple with at least one electrical butt connector to thereby seal the respective passage; and
an electrically conductive coating disposed on the frame and on each of the plurality of electrical connector insert shells to thereby form an electrical bonding surface.

2. The electrical multi-connector feedthrough panel of claim 1, further comprising at least one electrical connector insert configured for insertion into a respective electrical connector insert shell.

3. The electrical multi-connector feedthrough panel of claim 1, further comprising a panel mount coupled to the frame, wherein the panel mount has a structure interface coupling surface that has a contour corresponding to a contour of the structure.

4. The electrical multi-connector feedthrough panel of claim 1, wherein the frame has a contour that corresponds with a contour of the structure.

5. The electrical multi-connector feedthrough panel of claim 1, wherein each electrical connector insert shell includes an electrical connector insert retainer, and wherein the electrical connector insert retainer comprises:
the respective passage that extends between a first end and a second end of the electrical connector insert shell;
a resilient member configured to couple with and retain an electrical connector insert within the respective passage; and
a rotational orientation member configured to couple with one or more of the electrical connector insert and the at least one electrical butt connector.

6. The electrical multi-connector feedthrough panel of claim 1, further comprising an electrical grounding member that is distinct from and common to each of the plurality of electrical connector insert shells, wherein the electrical grounding member extends from one or more of the opposite sides of the frame.

7. The electrical multi-connector feedthrough panel of claim 1, wherein the frame is further configured to electrically bond with the structure.

8. The electrical multi-connector feedthrough panel of claim 1, wherein one or more of the plurality of electrical connector insert shells comprise electrical butt connector shells configured to receive electrical butt connectors.

9. An electrical multi-connector feedthrough panel comprising:
a frame having opposite sides, wherein one of the opposite sides is configured to couple with a structure so that the opposite sides span and seal, at least in part, a penetration in the structure; and
a plurality of electrical connector insert shells monolithically formed with the frame, each of the plurality of electrical connector insert shells having:
a first end extending from one of the opposite sides;
a second end extending from another of the opposite sides, wherein the first end is configured to sealingly receive a first electrical connector and the second end is configured to sealingly receive a second electrical connector to thereby form a respective sealed connector shell where a through passage extends between the first end and the second end, and wherein the through passage is configured to receive an electrical connector insert that extends between and is accessed through an opening of the through passage at the first end and an opening of the through passage at the second end; and an electrical connector insert retainer extending between the first end and the second end, wherein the electrical connector insert retainer has a rotational orientation member extending from a wall of the through passage and is configured to couple with the electrical connector insert and each of the first electrical connector and the second electrical connector to thereby rotationally align each of the first electrical connector and the second electrical with the electrical connector insert.

10. The electrical multi-connector feedthrough panel of claim 9, wherein the frame and the plurality of electrical connector insert shells comprise a plastic.

11. The electrical multi-connector feedthrough panel of claim 10, wherein the frame and the plurality of electrical connector insert shells comprise a composite.

12. The electrical multi-connector feedthrough panel of claim 10, wherein the frame and the plurality of electrical connector insert shells comprise a metallic coating so as to form an electrical bonding surface.

13. The electrical multi-connector feedthrough panel of claim 10, wherein at least one electrical connector insert shell of the plurality of electrical connector insert shells comprises a circular cross section.

14. The electrical multi-connector feedthrough panel of claim 10, further comprising a panel mount coupled to the frame, wherein the panel mount is configured to circumscribe a perimeter of the penetration to thereby seal, with the respective sealed connector shells, the penetration.

15. A method for sealing a penetration in a structure across a pressure differential, the method comprising:

coupling an electrical multi-connector feedthrough panel to the structure so that opposite sides of a frame of the electrical multi-connector feedthrough panel span the penetration;

wherein electrical connector inserts are inserted into a plurality of electrical connector insert shells monolithically formed with and protruding from the opposite sides the frame, each electrical connector insert shell extending through the frame to form a through passage that extends between and opens to each of the opposite sides of the frame, and each electrical connector insert extending through the through passage so that terminal ends of the electrical connector insert are accessed through a respective opening of the through passage, wherein each electrical connector insert is rotationally aligned within the respective electrical connector insert shell by a rotational orientation member extending from a wall of the through passage and being configured to couple with the respective electrical connector insert and at least one electrical connector coupled to the respective electrical connector insert.

16. The method of claim 15, further comprising coupling the at least one electrical connector to a respective electrical connector insert shell, wherein the at least one electrical connector is electrically bonded to the respective electrical connector insert shell.

17. The method of claim 15, further comprising electrically bonding at least one of the opposite sides of the frame to the structure.

18. The method of claim 15, further comprising electrically grounding the electrical multi-connector feedthrough panel to an electrical ground through an electrical grounding member extending from one or more of the opposite sides of the frame.

19. The method of claim 15, wherein the electrical connector inserts are selected from a number of different electrical connector inserts, and wherein at least one of the different electrical connector inserts has a different predetermined characteristic than another of the different electrical connector inserts.

20. The method of claim 19, wherein the different predetermined characteristic is a contact pin pattern.

* * * * *